May 18, 1965 A. MANCUSO 3,184,167
BLOW-PIPE FOR FABRICATING PLASTIC RESIN ARTICLES
Filed Feb. 6, 1964
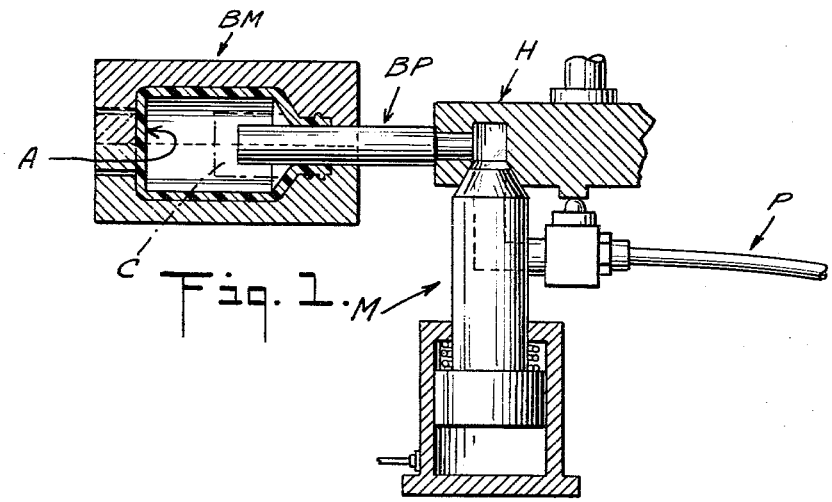
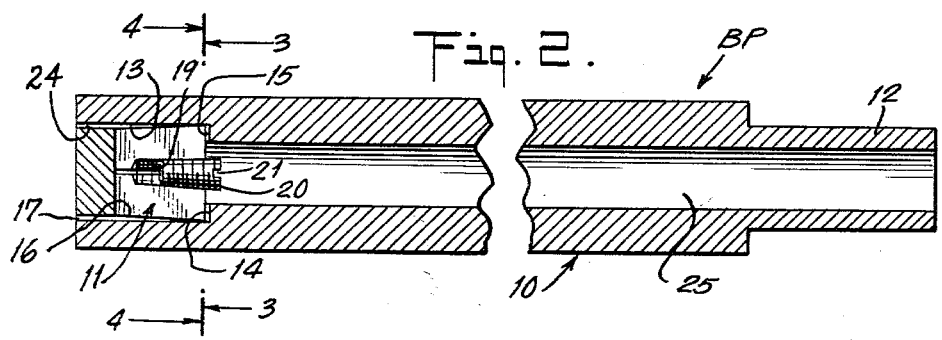
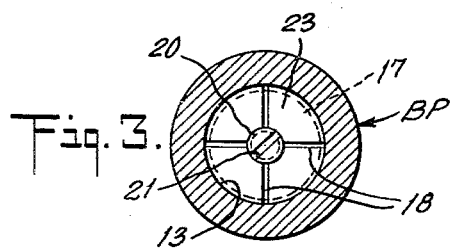
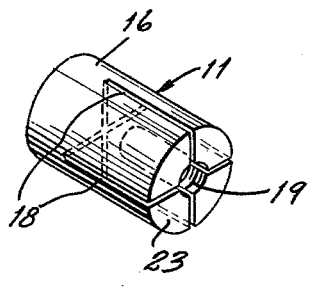
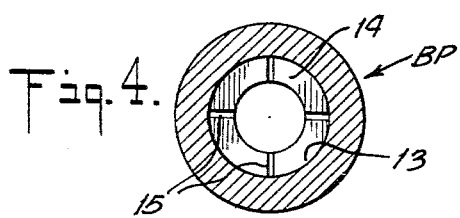
INVENTOR.
ARION MANCUSO
BY Krazinski & Nolan
ATTORNEYS

United States Patent Office 3,184,167
Patented May 18, 1965

3,184,167
BLOW-PIPE FOR FABRICATING PLASTIC
RESIN ARTICLES
Arion Mancuso, North Valley Stream, N.Y., assignor to
Uniloy Corporation, Natick, Mass., a corporation of
Delaware
Filed Feb. 6, 1964, Ser. No. 343,033
9 Claims. (Cl. 239—590)

The present invention relates to the fabrication of hollow articles formed of plastic resin in a blow mold and, more particularly, to such a blow-pipe which is an improvement over the blow-pipe disclosed in United States Patent No. 3,101,901.

In the aforementioned patent, a blow-pipe is disclosed which generally comprises a tubular body having an open end provided with a circular wall, and a cylindrical head fitted within the open end of the body having a wall formed with a plurality of circumferentially extending faces facing the circular wall to provide a plurality of restricted openings or passages between the walls through which air under pressure is directed to blow the article to be molded.

While this blow-pipe was an improvement over similar blow-pipes previously utilized, it has now been found that discrete passages due to localized impairment or restriction may cause uneven blowing of the article about its periphery to form articles of non-uniform wall thickness. Also, the blow-pipe just described lacked an arrangement to vary the flow of air through the restricted openings.

Accordingly, an object of the present invention is to provide an improved blow-pipe of the character indicated herein which overcomes the objections and disadvantages heretofore encountered.

Another object is to provide such a blow-pipe which assures an even flow of air at an annular zone to produce articles of uniform side wall thickness.

Another object is to provide such a blow-pipe which includes an arrangement for adjusting the flow of air through the annular zone.

Another object is to provide such an arrangement which is readily accessible without taking the blow-pipe apart.

Another object is to provide such an arrangement which can be taken apart for inspection and cleaning.

A further object is to provide such a blow-pipe which is simple, practical and economical in construction and reliable in operation.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, these objects are accomplished by a blow-pipe which generally comprises a tubular body having an open outer end formed with a bore providing a circular wall, a head fitted within the bore having a cylindrical surface at its outer end spaced from and facing the bore wall at its outer end to provide a continuous annular uniformly dimensioned passage, the head having passageway means for conducting air from the body to the passageway, and an arrangement for effecting securement of the head within the body at the inner end of its bore. Preferably, this arrangement also provides for adjusting the passageway means to control the flow of air through the annular passage.

A preferred embodiment of the invention has been chosen for purposes of illustration and description and is shown in the accompanying drawing, forming a part of the specification, wherein:

FIG. 1 is a fragmentary view, in section, of a machine for fabricating hollow articles formed of plastic resin, illustrating the blow mold, the blow-pipe and conventional means for supplying air through the blow-pipe.

FIG. 2 is an enlarged, fragmentary longitudinal sectional view of a blow-pipe in accordance with the present invention.

FIG. 3 is a sectional view taken along the line 3—3 on FIG. 2.

FIG. 4 is a sectional view taken along the line 4—4 on FIG. 2.

FIG. 5 is a perspective view of the head of the blow-pipe.

Referring now to FIG. 1 of the drawing in detail, a portion of a more or less conventional molding machine for fabricating hollow articles from plastic resin is shown, which machine generally comprises a blow mold BM in which a hollow article is blown, a blow-pipe BP on which a plastic charge C of resin is supported at one end, a head H for supporting the other end of the blow-pipe and positioning it at various stations of the machine, and mechanism M controlled by the head H and cooperating therewith to supply air under pressure from a pipe P to the blow-pipe. The operation of such a machine is well known and is described in the aforementioned patent.

As shown in FIGS. 2 to 5, the blow-pipe BP essentially comprises a tubular body 10, a cylindrical head 11, and an arrangement for effecting securement of the head 11 to the body 10 as described hereinafter.

The body 10 includes a bore extending longitudinally therethrough having an inner end section 12 for connection to the head H and having a larger outer end section 13 which provides an annular seat 14 between the bore sections. As shown in FIGS. 2 and 3, the bore section 13 has a circular side wall. As shown in FIGS. 2 and 4, the seat 14 has a plurality of radially extending, circumferentially spaced recesses 15 thereon.

The head 11 has a cylindrical surface 16 at its outer end concentric with, spaced from and facing the side wall of the bore section 13 at its outer end to provide a continuous annular uniformly dimensioned passageway 17 between the surface 16 and the side wall (FIGS. 2 and 3). The outer zone of the inner end of the head 11 engages the seat 14, so that the outer end of the head 11 is flush with the outer end of the body 10 and the passageway 17 extends into the charge C supported on the outer end of the blow-pipe BP.

The arrangement for effecting securement of the head 11 to the body, as shown herein, includes a plurality of radial, circumferentially spaced slots 18 in the head 11 extending from the inner end of the head 11 to the surface 16 to thereby subdivide the inner end of the head into segments 23; a central, tapered screw threaded bore 19 at the inner end of the head (FIG. 5); and a tapered screw 20 having a slotted head 21 and being threaded into the bore 19 for expanding and wedging the inner end of the head 11 against the wall of the body bore section 13.

This arrangement also provides for adjustably controlling the flow of air through the passage 17. This is accomplished by providing at least two recesses 15 and at least two slots 18, four being shown by way of example, with each slot 18 in registry with a recess 15, whereby fluid flow communication is established between the inner bore section 12 and the passage 17 through the recesses 15 and the slots 18. By threading the screw 20 further into the bore 19, the segments 23 are expanded to decrease the effective air flow area of the annular passageway 24 upstream of the passageway 17 and leading to the passageway 17 whereby the air flow can be adjusted without resorting to interchangeable heads 11 to provide for the desired flow of air which is required for articles varying in shape and/or size.

By accurately machining the wall of the outer bore section 13 and the surface 16 and other outer surfaces of the head 11, the surface 16 and the wall of the bore section 13 are concentrically positioned and are maintained in such position, because, upon expansion of the inner end of the head the forces applied by the screw 20 are uniformly and circumferentially exerted.

Such adjustment can be readily accomplished by removing the blow-pipe BP from the head H and inserting an instrument, such as a screw driver (not shown), into and through the inner end of the bore 12 and engaging the screw slot 21 therewith, and turning the screw driver to thread the screw inwardly or outwardly as required while maintaining the head 11 wedged in the bore section 13 to retain the head 11 in securement with the body 10.

From the foregoing description, it will be seen that the present invention provides an improved blow-pipe having a novel and advantageous air flow passage, securement arrangement and air flow control, and which is simple, practical and economical in construction, is reliable in operation and can be readily taken apart for inspection or cleaning. The blow-pipe is rugged in construction and can withstand prolonged use without the air passage losing its uniform dimensioning.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A blow-pipe for fabricating hollow articles formed of plastic resin which blow-pipe comprises in combination:
    a tubular body having an opening for connection to a source of gaseous medium under pressure and having an open outer end formed with a bore providing a circular wall, the body formed with a seat at the inner end of the bore;
    a head fitted within the bore of said body having a cylindrical surface at its outer end spaced from and facing the bore wall at the outer end of the bore to provide a continuous annular uniformly dimensioned passageway, the inner end of the head engaged against the seat of the bore, the head having a divergently tapered surface from the outer to inner end for effecting securement of said head at the inner end of the bore and against said bore seat, said head having passageway means therein for establishing fluid flow communication between said body member and said annular passageway.

2. A blow-pipe for fabricating hollow articles formed of plastic resins, which blow-pipe comprises in combination:
    a tubular body having an opening for connection to a source of gaseous medium under pressure and having an open outer end formed with a bore providing a circular wall, the body formed with a seat at the inner end of the bore, said seat characterized by a plurality of radially spaced slots on the surface thereof;
    a head fitted within the bore of said body having a cylindrical surface at its outer end spaced from and facing the bore wall at the outer end of the bore to provide a continuous annular uniformly dimensioned passageway, the inner end of said head having a plurality of passageways therein in registry with the spaced slots of said seat for establishing fluid flow communication between said body member opening and said annular passageway; and
    means for effecting securement of said head at the inner end of the bore.

3. A blow-pipe for fabricating hollow articles formed of plastic resin, which blow-pipe comprises in combination:
    a tubular body having an opening for connection to a source of gaseous medium under pressure and having an open outer end formed with a bore providing a circular wall, the body formed with a seat at the inner end of the bore, said seat surface characterized by a plurality of radial circumferential spaced slots on the surface thereof;
    a head fitted within the bore of said body, the head having a cylindrical surface at its outer end of the bore to provide a continuous annular uniformly dimensioned passageway, said head characterized by a plurality of radial circumferential spaced slots extending longitudinally from the inner end of said head to points spaced from the outer end of said head, which slots are in fluid flow communication with said annular passageway, the inner slots of said head in registry with and oriented in fluid flow communication with the slots in said bore seat thereby providing fluid flow communication between said body member opening and said annular passageway;
    means for effecting securement of said head at the inner end of said bore and against said bore seat.

4. A blow-pipe according to claim 1, wherein said head has a plurality of radial circumferentially spaced slots extending longitudinally from the inner end of said head to points spaced from the outer end of said head which slots subdivide the inner end of said head into segments and provide said passageway means of said head communicating with said annular passageway.

5. A blow-pipe according to claim 4, wherein said means for effecting securement of said head in said bore include a central screw threaded bore at the inner end of said head, and a screw threaded into said screw bore for expanding and wedging the inner end of said head against said body at its bore wall and for expanding the segments between the ends thereof to thereby adjust the effective air flow area leading to said annular passageway.

6. A blow-pipe according to claim 5, wherein said screw threaded bore and said screw are tapered.

7. A blow-pipe according to claim 5, wherein said body opening is opposite and in alignment with said screw to facilitate insertion of an instrument for turning said screw.

8. A blow-pipe for fabricating hollow articles formed of plastic resin, which blow-pipe comprises a tubular body having an opening at one end for connection to a source of gaseous medium under pressure and having an opening at its opposite end formed with a circular bore and a seat at the inner end of said bore provided with radially extending circumferentially spaced recesses, a head in said bore having a cylindrical surface at its outer end spaced from and facing said bore and being concentric with said bore to provide an annular circular passageway of uniform dimension, said head having its inner end engaging said seat and having a plurality of radial slots extending longitudinally from the inner end to said surface with the inner end of each slot in registry with a said recess, said head having central bore means at its inner end, and means inserted into said bore means and cooperating therewith for expanding said head to adjust the effective air flow area leading to said circular passageway.

9. A blow-pipe according to claim 8, wherein said two last mentioned means are tapered.

References Cited by the Examiner

UNITED STATES PATENTS

| | | | |
|---|---|---|---|
| 1,779,009 | 10/30 | Negro | 239—601 |
| 2,557,106 | 6/51 | Hughes | 239—587 |
| 2,721,089 | 10/55 | Shames | 285—338 |
| 2,732,106 | 1/56 | Harland | 222—567 |
| 3,101,901 | 8/63 | Britten | 239—132 |

FOREIGN PATENTS

| | | |
|---|---|---|
| 655,286 | 1/38 | Germany. |
| 727,244 | 3/32 | France. |
| 782,182 | 3/35 | France. |
| 28,776 | 12/04 | Great Britain. |

EVERETT W. KIRBY, *Primary Examiner.*